(12) United States Patent
McCormick et al.

(10) Patent No.: US 8,172,300 B2
(45) Date of Patent: *May 8, 2012

(54) PROTECTIVE LAMINATES

(75) Inventors: Chris E. McCormick, Draper, UT (US); Brent A. Strong, Sandy, UT (US); Mike D. Ridges, American Fork, UT (US); Kevin A. Plumb, Sandy, UT (US); Jeff Smith, Draper, UT (US)

(73) Assignee: Clearplex Corporation, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/167,412

(22) Filed: Jun. 23, 2011

(65) Prior Publication Data

US 2011/0256368 A1 Oct. 20, 2011

Related U.S. Application Data

(63) Continuation of application No. 11/939,441, filed on Nov. 13, 2007, now Pat. No. 7,992,917, which is a continuation-in-part of application No. 10/993,619, filed on Nov. 19, 2004, now abandoned.

(60) Provisional application No. 60/523,966, filed on Nov. 21, 2003, provisional application No. 60/552,784, filed on Mar. 12, 2004.

(51) Int. Cl.
*B60J 1/20* (2006.01)

(52) U.S. Cl. ...... 296/95.1; 428/40.1; 428/343; 428/412; 428/480

(58) Field of Classification Search .......... 296/95.1; 128/40.1, 223, 343, 412, 480
See application file for complete search history.

(56) References Cited

U.S. PATENT DOCUMENTS

| 4,310,600 A | 1/1982 | Cross |
| 4,477,519 A | 10/1984 | Frye |
| 4,567,237 A | 1/1986 | Johnson |

(Continued)

FOREIGN PATENT DOCUMENTS

EP 0539099 4/1993

(Continued)

OTHER PUBLICATIONS

3M Introduces Anti-Graffitti Solution for Commercial Buildings, 3M United States, Jul. 29, 2002, 2 pages.

(Continued)

*Primary Examiner* — Glenn Dayoan
*Assistant Examiner* — Paul Chenevert
(74) *Attorney, Agent, or Firm* — Workman Nydegger (57) ABSTRACT

Protective laminate films protect an underlying window surface from scratches or other damage. The laminate films generally include a substrate having a scratch resistant coating adhered to one side and an adhesive layer adhered to an opposite side. Adhesion promoter and primer layers may be provided to enhance adhesion of the scratch-resistant coating to the surface. Each layer is transparent such that, when applied to a surface, the laminate film does not significantly impact or reduce optical clarity. Each layer may also be flexible so that the laminate films can be molded to a curved surface. Generally, the scratch resistant coating protects the laminate film from scratching or other damage, such as from debris or impacts. The substrate provides structural integrity to the laminate film and may provide some impact dispersion. The adhesive layer, in addition to adhering the laminate films to the surface, may also provide significant impact resistance that protects the surface from cracks or damage due to debris or impacts.

34 Claims, 3 Drawing Sheets

U.S. PATENT DOCUMENTS

| | | | |
|---|---|---|---|
| 4,751,139 | A | 6/1988 | Hensel |
| 4,777,090 | A | 10/1988 | Ovshinsky |
| 4,801,640 | A | 1/1989 | Dallmann |
| 5,002,326 | A * | 3/1991 | Westfield et al. ............ 296/95.1 |
| 5,132,588 | A | 7/1992 | Warman |
| 5,169,694 | A | 12/1992 | Endo |
| 5,294,272 | A | 3/1994 | Peterson |
| 5,346,569 | A | 9/1994 | Simon |
| 5,415,942 | A | 5/1995 | Anderson |
| RE35,318 | E | 8/1996 | Warman |
| 5,653,497 | A | 8/1997 | Campfield |
| 5,677,050 | A | 10/1997 | Bilkadi |
| 5,730,644 | A | 3/1998 | Pfanstiehl |
| 5,820,201 | A * | 10/1998 | Jabalee ............ 296/136.02 |
| 5,820,957 | A | 10/1998 | Shroeder |
| 5,860,689 | A | 1/1999 | Campfield |
| RE36,308 | E | 9/1999 | Yang |
| 5,972,453 | A * | 10/1999 | Akiwa et al. ............ 428/40.1 |
| 6,030,671 | A * | 2/2000 | Yang et al. ............ 428/34 |
| 6,082,535 | A | 7/2000 | Mitchell |
| 6,142,868 | A | 11/2000 | Pfanstiehl |
| 6,143,387 | A | 11/2000 | Kubler |
| 6,227,599 | B1 | 5/2001 | Campfield |
| 6,250,765 | B1 | 6/2001 | Murakami |
| 6,276,741 | B1 | 8/2001 | Campfield |
| 6,372,313 | B1 | 4/2002 | D'Alessio |
| 6,391,400 | B1 | 5/2002 | Russell |
| 6,461,709 | B1 * | 10/2002 | Janssen et al. ............ 428/41.7 |
| 6,482,488 | B1 * | 11/2002 | Janssen et al. ............ 428/40.1 |
| 6,492,017 | B1 | 12/2002 | Bohm |
| 6,613,411 | B2 | 9/2003 | Kollaja |
| 6,614,423 | B1 | 9/2003 | Wong |
| 6,634,695 | B2 | 10/2003 | Campfield |
| 6,660,388 | B2 * | 12/2003 | Liu et al. ............ 428/421 |
| 6,660,397 | B2 | 12/2003 | Fitch |
| 6,777,055 | B2 * | 8/2004 | Janssen et al. ............ 428/41.8 |
| 6,802,416 | B1 | 10/2004 | D'Alessio |
| 6,831,714 | B2 | 12/2004 | Masaki |
| 6,841,190 | B2 | 1/2005 | Liu |
| 6,878,425 | B1 | 4/2005 | Gomes |
| 6,960,040 | B2 | 11/2005 | D'Alessio |
| 6,975,888 | B2 | 12/2005 | Buesseler |
| 7,389,869 | B2 | 6/2008 | Mason |
| 7,529,364 | B2 | 5/2009 | Buehler |
| 7,558,594 | B2 | 7/2009 | Wilson |
| 2003/0064198 | A1 | 4/2003 | Thomsen |
| 2004/0048023 | A1 | 3/2004 | Clieve |
| 2005/0022924 | A1 | 2/2005 | Blackburn |
| 2005/0047589 | A1 | 3/2005 | Chang |
| 2005/0116334 | A1 | 6/2005 | Buehler |
| 2006/0222801 | A1 | 10/2006 | Mase |
| 2007/0026234 | A1 | 2/2007 | Mase |
| 2007/0229962 | A1 | 10/2007 | Mason |
| 2008/0156414 | A1 | 7/2008 | Campfield |
| 2008/0206522 | A1 | 8/2008 | McCormick |
| 2009/0086415 | A1 | 4/2009 | Chipping |
| 2009/0301907 | A1 | 12/2009 | Mason |
| 2009/0325657 | A1 | 12/2009 | Ramsdell |
| 2010/0270189 | A1 | 10/2010 | Pedersen |

FOREIGN PATENT DOCUMENTS

| | | |
|---|---|---|
| JP | 57047213 A * | 3/1982 |
| KR | 200206982 | 12/2000 |
| WO | WO03036454 | 5/2003 |
| WO | WO2007046637 | 4/2007 |

OTHER PUBLICATIONS

3M Optically Clear Laminating Adhesives, 3M United States, Jun. 2001, 6 pages.

3M Optically Clear Adhesives, 3M United States, date unkown, 2 pages.

3Mtm Optically Clear Adhesive 8141 Clear 24 in × 180 ft, 1 per case, 3M United States, date unknown, 2 pages.

3Mtm Optically Clear Laminating Adhesives, 3M United States, date unknown, 2 pages.

ScotchgardTM Anti-Graffitti Window Film Ag-4 60 ft. × 150 ft., 3M United States, date unknown, 5 pages.

ScotchgardTM Anti-Graffitti Window Film Ag-7 60 ft. × 100 ft., date unknown, 2 pages.

Protection against Shattering Experiences, DuPontTM SpallshieldR, date unknown, 6 pages.

Ricochet Protects, www.richochet.com, date unknown, 4 pages.

Supertint Sun Control Specialists, www.supertint.com, date unknown, 11 pages.

Llumar Window Film, www.llumar.com, date unknown, 5 pages.

How NASCAR Safety Works, www.auto.howstuffworks.com, date unknown, 5 pages.

Tocken Wrapper, Protective film for ipod shuffle; www.tocken.co.kr; 2004-2005.

Tocken Wrapper for iPod mini http://caizer.com/?mid=tech&page=22&document_sr1=20234&listStyle=&page=; Feb. 18, 2005.

http://www.enfun.net/technique/review/?step=20 &dataSeqNo=42417; Jan. 13, 2005.

Statement of Min-Woo Seo; Mar. 10, 2010.

http://www.appleforum.com; AppleForum; Jul.-Nov. 2005.

Withipod Community for Korean Ipod Users; http://withipod.net/?mid=podmagazine_notice&category=2078464&search_keyword=tocken&search_target=title&document_srl=2078532; Nov. 22, 2004.

Tocken Wrapper, User's Review; www.withipod.net; Mar. 24, 2005.

Tocken Wrapper, User's Review; www.withipod.net; Mar. 21, 2005.

Tocken Wrapper, Magazine Article, MacMadang, p. 48, Published Jul. 1, 2005.

User's review of Noxk PSP protection film from internet website; http://raven.egloos.com/1076693; Jul. 25, 2005.

Sales Bulletin for Tocken Wrapper; http://kmug.co.kr, Sep. 11, 2005.

Crandall/Dahl/Lardner; "An Introduction to the Mechanics of Solids", pp. 273-276; Jan. 25, 1996.

Presentation for Oral Hearing for Invalidation and Scope Confirmation Trial of Registered Patent No. 784501 (Case No. 2008 Dang 3751 and 2009 Dang 1523); Kim & Chang, Mar. 16, 2010.

English Translation of Sep. 18, 2009 Brief for Seung-Kyun Oh (President of Korean distributor for Zagg), Invalidation and Scope Confirmation Trial of Registered Patent No. 784501 (Case No. 2008 Dang 3751 and 2009 Dang 1523).

Oct. 14, 2009 Brief for Seung-Kyun Oh (president of Korean distributor for Zagg), Invalidation and Scope Confirmation Trial of Registered Patent No. 784501 (Case No. 2008 Dang 3751 and 2009 Dang 1523).

Oct. 14, 2009 Brief for SGP, Invalidation and Scope Confirmation Trial of Registered Patent No. 784501 (Case No. 2008 Dang 3751 and 2009 Dang 1523).

Nov. 14, 2009 Brief for Seung-Kyun Og (President of Korean distributor for Zagg), Invalidation and Scope Confirmation Trial of Registered Patent No. 784501 (Case No. 2008 Dang 3751 and 2009 Dang 1523).

U.S. Appl. No. 10/993,619, mail date Aug. 30, 2006, Office Action.

U.S. Appl. No. 10/993,619, mail date Mar. 8, 2007, Office Action.

U.S. Appl. No. 10/993,619, mail date Aug. 15, 2007, Office Action.

U.S. Appl. No. 10/993,619, mail date Feb. 5, 2008, Office Action.

U.S. Appl. No. 11/939,441, mail date Nov. 10, 2010, Office Action.

U.S. Appl. No. 11/939,441, mail date Jan. 15, 2010, Office Action.

U.S. Appl. No. 11/939,441, mail date Jun. 7, 2010, Office Action.

U.S. Appl. No. 11/939,441, mail date Apr. 6, 2011, Notice of Allowance.

U.S. Appl. No. 11/939,441, mail date Jun. 7, 2011, Notice of Allowance.

U.S. Appl. No. 13/167,412, mail date Dec. 27, 2011, Notice of Allowance.

U.S. Appl. No. 12/111,537, mail date Jan. 24, 2012, Office Action.

* cited by examiner

PROTECTIVE LAMINATES

CROSS-REFERENCE TO RELATED APPLICATIONS

This application is a continuation of U.S. patent application Ser. No. 11/939,441, filed Nov. 13, 2007 now U.S. Pat. No. 7,992,917, which is a continuation-in-part of copending U.S. patent application Ser. No. 10/993,619, filed Nov. 19, 2004, abandoned, which claims the benefit of U.S. Provisional Patent Application No. 60/523,966, filed Nov. 21, 2003, and U.S. Provisional Patent Application No. 60/552,784, filed Mar. 12, 2004.

BACKGROUND OF THE INVENTION

1. The Field of the Invention

The present application relates to protective laminates and coating. More particularly, the present invention relates to durable optically transparent laminates for protecting windshields from damage due to gravel, rocks or other debris impacting the windshield.

2. The Relevant Technology

Every year, millions of windshields are damaged by rocks or other debris that impact the windshield. Winter is particularly hazardous in many areas where environmental constraints on the use of salt to control icy surfaces result in a great deal of sand or other solid substances being used. Sand, natural rubble and construction debris have created a year-round hazardous situation for glass (and/or laminated) windshields in any overland vehicle or glass in other equipment, as the sand and other solid debris are thrown up and collide with windshields.

If the damage is slight, such as a small chip in the windshield, it can often be repaired in situ. Greater damage, such as larger chips and cracks, may require the windshield to be replaced. The cost of repairing or replacing a windshield can range up to hundreds of dollars or more. Accordingly, there is a continuing need for improved coatings and methods that can reduce windshield replacements by protecting against windshield damage from impacting debris.

Previous attempts to provide exterior films to protect windshields from damage have failed or are limited for a number of reasons. Such reasons include, for example, that the films: do not cover the entire glass; do not adhere well to the glass; do not readily conform to a curved windshield; are not UV stable over the long term; are readily scratched by windshield wipers and/or car wash brushes; and/or have poor optical quality due to inferior film or adhesive restrictions.

For example, U.S. Pat. No. 6,634,695 ("the '695 patent") discloses an impact resistant barrier around the periphery of a windshield. Barrier materials disclosed in the '695 patent include clear polymeric films as well as opaque materials such as rubber, plastic, or metal. Particularly, one suitable barrier material disclosed by the '695 patent is SCOTCH-CAL™, an 8 mils thick polyurethane film sold by 3M. By limiting the extent of these clear and opaque barriers to the periphery, high visibility is maintained in the center of the windshield while protection is provided around the periphery. This approach is clearly limited in that such barriers are not suitable to cover the entire windshield. Thus, in order to maintain a suitable visibility where the barrier materials are applied, the '695 patent limits itself to protecting only those portions of the windshield where high visibility is not necessary.

Attempts thus far at providing a clear protective film to cover an entire automobile windshield have failed for various reasons, typically because the suggested films are not sufficiently transparent, distort the view, are not UV stable, or scratch easily. For example, the transparent laminate materials currently commercially available as Scotchgard Anti-Graffiti Window Film AG-4 and Scotchgard Anti-Graffiti Window Film AG-7 from 3M Corporation were tested for windshield applications. These films were found to be unsuitable because they do not provide sufficient scratch resistance for windshield applications and the underlying PET is not UV stable. Under the demanding conditions windshield use can place upon a laminate film, the AG-4 and AG-7 were both been found to degrade and scratch more than is acceptable.

Accordingly, there is a continuing need for new and improved methods and coatings to protect an entire windshield from damage without significantly reducing the optical qualities of the windshield.

BRIEF SUMMARY OF THE INVENTION

The present application provides protective coatings and laminates for vehicle and equipment windshields. The protective coatings and laminates are optically transparent and thin yet are able to protect an automobile windshield from damage caused by object impacts and scratching. The various layers of the protective laminate films serve one or more of several principal functions, including: scratch resistance, structural support for the laminate film, shock absorbance, and adhesion to an underlying glass surface. These functions are obtained while maintaining high clarity and being substantially distortion free.

Accordingly, a first exemplary embodiment of the invention is an optically transparent laminate film for protecting a vehicle windshield. The film generally includes a substrate comprising a first surface and a second surface, a scratch-resistant coating disposed on the first surface of the substrate, and an adhesive layer disposed upon the second surface of the substrate. An adhesion promoter may be applied to the first surface of the substrate prior to application of the scratch-resistant coating to promote better adhesion of the scratch-resistant coating to the substrate. A primer coating can also be included between the scratch-resistant coating and the adhesion promoter to further enhance adhesion of the scratch-resistant coating to the substrate. The primer may also be formulated to provide UV protection for the substrate. An adhesion promoter may also be applied between the substrate and adhesive layer to promote better adhesion between the substrate and adhesive layer.

Another exemplary embodiment of the invention is an optically transparent laminate film for protecting a vehicle windshield. This film generally includes a scratch-resistant substrate comprising a first surface and a second surface, the first surface comprising a material that is substantially scratch resistant, and a shock absorbing adhesive layer disposed upon a second surface of the substrate, wherein the shock absorbing adhesive layer is effective to substantially disperse the impact forces of debris that contacts an automobile windshield and thereby reduce damage to the windshield and securely adhere the laminate film to the underlying automobile windshield. An adhesion promoter may be applied between the scratch-resistant substrate and shock absorbing adhesive layer to enhance adhesion between the substrate and adhesive layer.

Yet another exemplary embodiment of the invention is an optically transparent laminate film for protecting a standard overland laminated safety glass automobile windshield. The film generally includes a transparent substrate comprising a first surface and a second surface, the substrate having a thickness of from about 2 mils to about 10 mils, or about 2.5 mils to about 8 mils, or about 3 mils to about 5 mils, a scratch-resistant coating disposed upon a first surface of the substrate, wherein the scratch resistant coating has a thickness from about 2 microns to about 20 microns or about 5 microns to about 15 microns, or about 7.5 microns to about 12.5 microns, and an adhesive layer disposed upon a second surface of the substrate, wherein the adhesive layer has a thickness from about 12 GSM to about 30 GSM, or about 14 GSM to about 20 GSM and wherein the adhesive layer is shock absorbing such that it substantially disperses forces from impacting debris and thereby reduces damage to an underlying glass layer. An adhesion promoter and/or primer coating may be applied between the substrate and scratch-resistant coating to further enhance adhesion of the scratch-resistant coating to the substrate and/or between the substrate and adhesive layer.

The substrate may comprise, for example, plasticized vinyl (polyvinyl chloride with plasticizer) or other optically transparent materials such as polyethylene terephthalate (PET), PET/polycarbonate blend, polyester, polyurethane, polycarbonate, acrylic based materials, and blends and combinations of the foregoing.

The scratch-resistant coating may comprise any material that is capable of providing scratch-resistance to the substrate while being sufficiently flexible as to remain optically transparent even if the laminate film is bent, curled or rolled, such as when it is rolled onto a spool for storage and transport and/or applied around the curved exterior surface of a windshield or other generally curved window surface. Examples include certain scratch-resistant polymers, such as scratch-resistant polyesters and scratch resistant acrylic acrylates.

An example of a suitable adhesive is an optically clear, pressure sensitive, solvent based acrylic adhesive.

An example of a suitable adhesion promoter is a thinly applied acrylic resin having a thickness in a range of about 0.05 micron to about 1 micron, or about 0.075 micron to about 0.75 micron, or about 0.25 micron (i.e., about 0.00001 inch).

An example of a suitable primer is a mixture or copolymer of a fluoropolymer and acrylic resin, optionally with a UV inhibitor to provide UV protection to the underlying layers, including the polymer substrate, which may degrade over time when exposed to UV radiation. The primer may have a thickness of about 0.5 micron to about 10 microns, or about 0.75 micron to about 7.5 microns, or about 1 micron to about 5 microns.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to protective laminate films for use in protecting automobile windshields. When properly applied to the exterior of a glass windshield, the protective laminate films can extend the life of a windshield by reducing or eliminating windshield damage caused by flying rocks or other debris. The various layers of the protective laminate films serve one or more of several principal functions, including scratch resistance, structural support for the laminate film, shock absorbance, and adhesion to an underlying glass surface. In addition, the protective laminate films maintain an optically clear and substantially distortion-free view for a driver and avoid scratches or other marring that conventional attempts to protect a windshield are subject to. At the end of the laminate film's service life or when it is damaged, preferred laminate films of the invention can be removed by a user without great difficulty, returning the windshield to its original state and/or allowing the application of a new protective laminate film.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale. In particular, the various layers of the protective laminate films are drawn without regard to any particular layer thicknesses. No inference should therefore be drawn from the drawings as to the layer thicknesses from the drawings.

In the following description, numerous specific details are set forth in order to provide a thorough understanding of the present invention. It will be obvious, however, to one skilled in the art that the present invention may be practiced without these specific details. In other instances, well-known aspects of laminate films have not been described in particular detail in order to avoid unnecessarily obscuring the present invention.

All measurements disclosed herein are at sea level at standard temperature and pressure, unless indicated otherwise.

Figure 1:
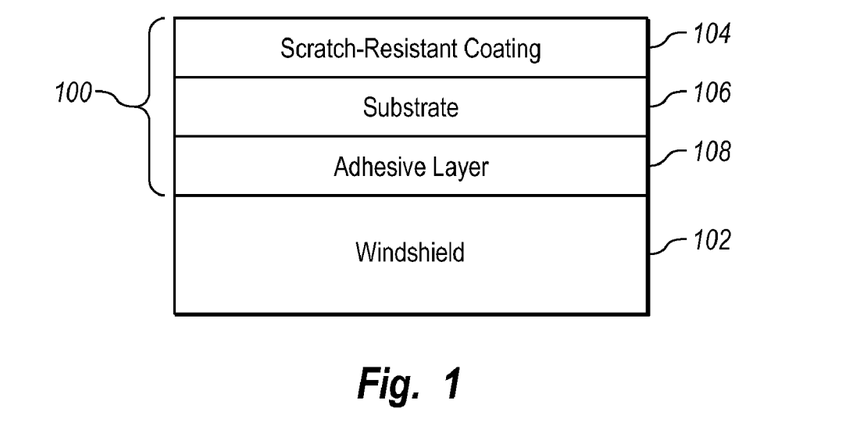
FIG. 1 is a box diagram that schematically illustrates a windshield with a protective laminate film attached thereto according to one embodiment of the invention.

FIG. 1 depicts an example of a protective laminate film 100 adhered to a windshield 102 so as to yield a protected windshield according to the invention. In this embodiment, the protective laminate film 100 includes a substrate 106 with a scratch resistant coating 104 on an exterior surface thereof and an adhesive layer 108 on a windshield adjacent surface thereof.

Figure 2:
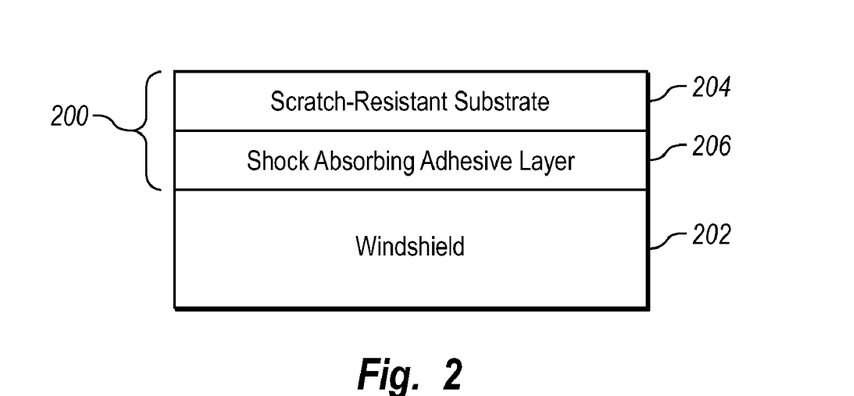
FIG. 2 is a box diagram that schematically illustrates a windshield with a protective laminate film attached thereto according to another embodiment of the invention.

Although the layered structure depicted in FIG. 1 is one exemplary structure, other possible layered structures may also be used depending upon the details of the windshield the laminate film is designed for as well as the intended use. In addition, materials developed in the future may alter the preferred construction of the laminated films disclosed herein. For example, FIG. 2 depicts laminate film 200 adhered to windshield 202. Laminate film 200 includes a scratch-resistant substrate 204 and a shock absorbing adhesive layer 206.

Figure 3A:
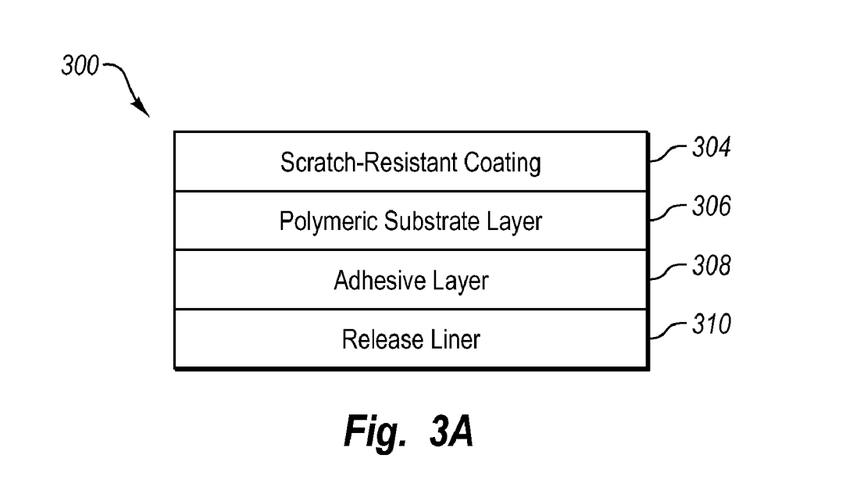
FIG. 3A is a box diagram that schematically illustrates a protective laminate film with a release liner to protect the adhesive layer during storage and transport.
Figure 3B:
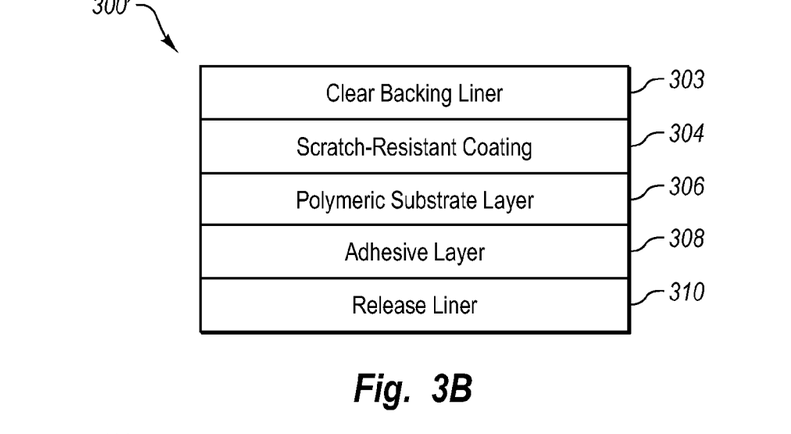
FIG. 3B is a box diagram that schematically illustrates a protective laminate film similar to the laminate film of FIG. 2A but with a clear backing layer to protect the scratch-resistant coating during storage and transport.
Figure 4:
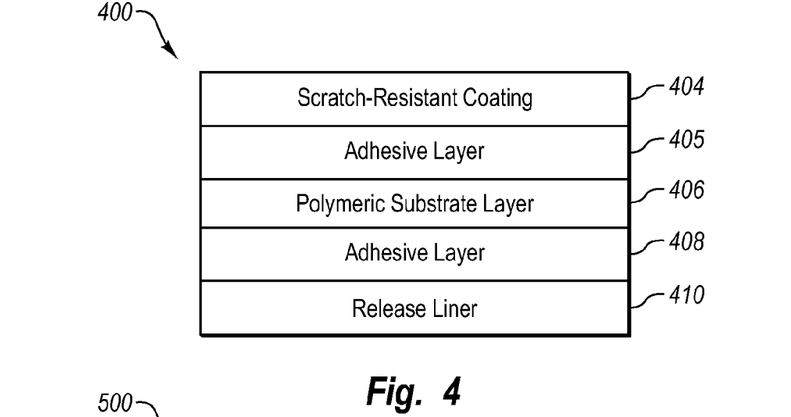
FIG. 4 is a box diagram that schematically illustrates a protective laminate film with an adhesive layer between the substrate and scratch-resistant coating to improve adhesion of the scratch-resistant coating to the substrate.
Figure 5A:
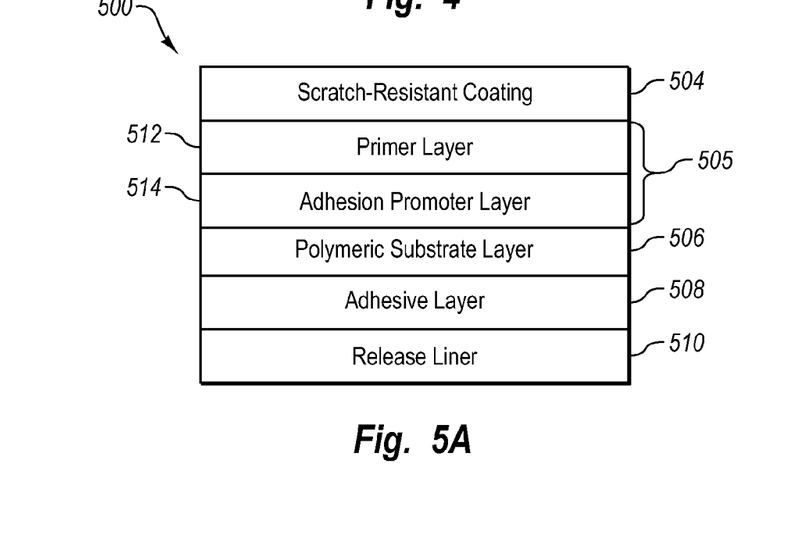
FIG. 5A is a box diagram that schematically illustrates a protective laminate film with an adhesive promoter layer and a primer layer between the substrate and scratch-resistant coating to improve adhesion of the scratch-resistant coating to the substrate and provide improved UV protection.
Figure 5B:
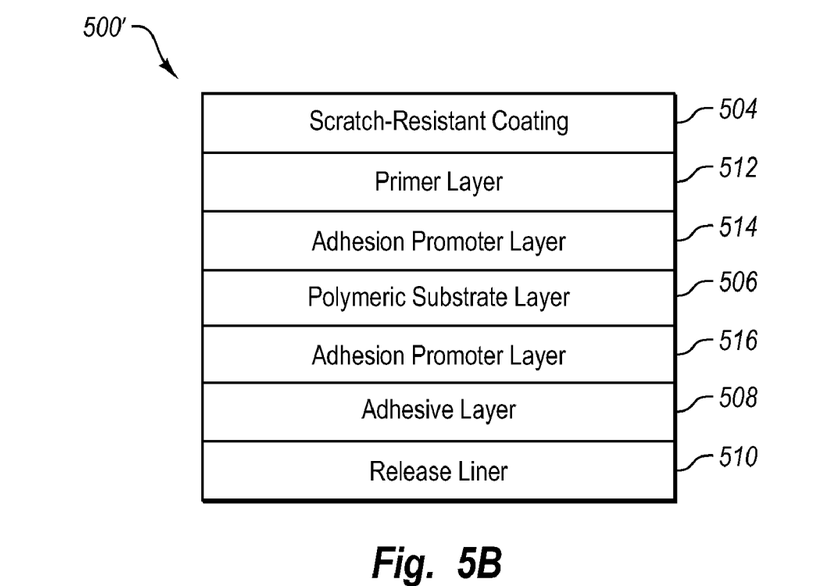
FIG. 5B is a box diagram that schematically illustrates a protective laminate film similar to the laminate film of FIG. 4A but with an additional adhesion promoter layer between the substrate and adhesive layer.

Other non-limiting examples of different layered structures include: scratch resistant coating/substrate/shock absorbing adhesive layer/shock absorbing substrate/adhesive; scratch resistant coating/shock absorbing layer/substrate/adhesive; and other similar structures. In each of the foregoing, one or more of the substrate(s) and the adhesive(s) can be shock absorbing. The particular selection of layer selection and thicknesses may depend on the angle at which a windshield is inclined, such as 90° in the case of security vehicles all the way down to about 27° for some sport vehicles. Additional examples of layered protective film structures are illustrated in FIGS. 3-5, discussed below.

As previously mentioned, there are several functions performed by laminate film 100. These include at least scratch resistance, structural integrity, shock absorbance, impact dispersion, and windshield adhesion. In order to meet the foregoing requirements, one or both of the substrate 106 and the adhesive layer 108 can be selected to provide shock absorbance.

In addition to satisfying the foregoing design limitations, one or more layers in the laminate film can provide UV protection, for example of greater than 99%. Various embodiments will also preferably repel water and/or dampen sound as well as have the ability for quick and easy removal from a windshield.

The protective laminate films of the invention (and thus each of the layers discussed herein) must be optically clear and substantially distortion free. They should preferably satisfy certain minimum requirements as to flexibility (suitable for application to a curved windshield and/or storage on a roll), extensibility (from 100 to 600% elongation at break), haze (less than 1%), consistent refractive index over the entire laminate film, high transmittance (over 97%) over the visible wavelength range (approximately 400-700 nm), chemical, water, and temperature resistance, and general durability (at least 1 year under normal wear, preferably at least 3 years, more preferably at least 5 years). In effect, the laminate films of the invention are preferably virtually unnoticeable to a user looking through a windshield 102 over which a protective laminate film 100 is applied. In addition, a windshield supporting the laminate film must continue to satisfy all applicable government standards, including for example the Department of Transportation's Head Impact Crash Tests.

Referring again to FIG. 1, scratch resistant coating 104 is employed to prevent scratches or markings on the windshield from windshield wipers, car wash brushes, small debris that impacts the windshield, and the like. Normally a glass windshield is substantially resistant to such scratching or marring and no scratch resistant coating is needed. The application of the protective laminate film, however, creates the need for a scratch resistant coating due to the tendency of most transparent materials that can be used in a protective laminate film to scratch or retain other undesirable markings. If the laminate film is to be used in an area requiring significantly heavier wiper usage, such as certain areas of the Pacific Northwest, more durable scratch resistant coatings may be required.

Accordingly, scratch resistant coating 104 can be any transparent material suitable for preventing scratching and marring while meeting the other design requirements for the laminate film. Scratch resistant coatings are generally known in the art, although not all are suitable for use on automobile windshields. For example, the scratch resistant coating marketed as MADICO CL-400 is suitable for use in short term applications in the protective laminate films of the invention. Longer lasting scratch resistant coatings are characterized by having only a 2% or less increase in haze after receiving 100 strokes from a Tabor wheel (the Tabor wheel is a device for testing hardness that is known in the art). In addition, preferred scratch resistant coatings allow focused light (such as headlights) to pass through without scattering. This feature is obtained in sufficiently durable scratch resistant coatings by reducing the number of light scattering particulates, such as silicates or other contaminants, that are typically present in scratch resistant coatings. In addition, long lasting scratch resistant coatings can be UV stabilized by methods known in the art to prevent them from deteriorating due to UV light. A long lasting scratch resistant coating as described above is currently available from Madico Inc. in Woburn, Mass.

Examples of scratch resistant coatings include crystalline polyesters, acrylic acrylates, melamine, and the like. The scratch resistant coatings can be applied directly to the substrate as a solid film by means of an adhesive or a liquid applied to the substrate. An exemplary scratch resistant coating is applied as a liquid and heated to remove solvent and effect curing. One such material includes a mixture of one or more acrylic monomers, colloidal silica, ethanol, and a silicone slip agent. Adhesion promoters and/or primers can be used to increase adhesion of the scratch resistant layer to the substrate.

The scratch resistant coatings as used in embodiments of the invention preferably have a thickness of from about 2 microns to about 20 microns, more preferably from about 5 microns to about 15 microns, and most preferably from about 7.5 microns to about 12.5 microns.

Substrate 106, in turn, must be flexible such that it can conform to a curved glass surface while being sufficiently rigid and durable to hold the protective laminate film together in adverse conditions or over time. In addition, the substrate 106 will disperse the impact forces of an impacting rock or other debris. Preferred substrates will also be UV stabilized so they do not degrade over the usable life of the laminate film. Examples of suitable substrates may include plasticized vinyl (polyvinyl chloride with plasticizer) or other optically transparent materials such as polyethylene terephthalate (PET), PET/polycarbonate blend, polyester, polyurethane, urethane, polycarbonate, acrylic based materials, and blends and combinations of the foregoing may be used as the substrate. Manufacturers of the foregoing include, for example, General Electric Polymers, DuPont, 3M, Avery Dennison, Bekaert Film, CP Films, Hanita Films, Rohm Haas, Madico, Hisco, Johnson Laminating, Kimoto Tech, Strata Film Coatings and InteliCoat.

In one embodiment, the substrate and scratch resistant coating can include an optical grade, UV stable polyester layer with a scratch-resistant and mar-resistant UV stable coating (made of TINUVIN®-enriched acrylic acrylate scratch resistant coating, for example) on the outer surface.

In another embodiment of the invention, a combined scratch resistant substrate can be obtained and used. Such a scratch resistant substrate may be a monolithic material or may comprise a laminate with various layers.

The substrate, whether coated with an additional scratch-resistant coating or being a combined monolithic, scratch-resistant substrate, preferably has a thickness of from about 2 mils to about 10 mils, more preferably from about 2.5 mils to about 8 mils, still more preferably from about 3 mils to about 5 mils.

The optical grade adhesive layer 108 is used to adhere the laminate film to the windshield. Preferred adhesives are, by way of example, optically clear, pressure sensitive, solvent based, acrylic adhesives. Other suitable adhesives may include solvent based adhesives, hot melt adhesives, water based adhesives, and alcohol-based adhesives. Manufacturers of such adhesives include, by way of example only, corporations such as Ashland Chemical, Adhesive Research, Rohm Haas, National Starch, Solutia, Sovereign, and Avery Dennison.

Several exemplary optical grade adhesives that are currently commercially available from the 3M Corporation include: 3M 1 mil permanent and OPTICALLY CLEAR LAMINATING ADHESIVES 8141, 8142, 8161, and 9483. Other preferred adhesives include INTELICOAT 0.00325, INTELICOAT 0.003 OCAV3, and INTELICOAT 0.003 OCALT, MADICO "X" and "G" adhesives, KIMOTO TECH adhesives, and optical grade adhesives from LINTECH. Of course, any of numerous other optical grade adhesives may be suitable so long as they meet the aforementioned design criteria for the laminate film. In addition, suitable optical grade adhesives are non-crystalline. For example, a number of polyurethane and acrylic based optical grade adhesives are known in the art. An adhesion promoter can be used to increase adhesion of the adhesive layer to the substrate.

Depending upon the selected material and the associated hardness, the adhesive layer preferably has a thickness of from about 1 micron to about 50 microns, more preferably from about 5 microns to about 40 microns, and most preferably from about 10 microns to about 30 microns. Alternatively, the adhesive layer can be characterized by GSM (grams per squared meter). Thus, the preferred adhesive can have a thickness of from about 12 to about 30 GSM, more preferably from about 14 to about 20 GSM. Although it is possible to use more adhesive than 20 GSM to obtain a higher level of impact protection, the higher levels of adhesive provide a greater chance of increased optical distortion in applications where the rake of the windshield is closer to the horizontal plain.

In addition, either or both of the adhesive layer 108 and substrate 106 can provided the requisite shock absorbing functions. Thus, preferred adhesive materials will be selected to optimize shock absorbing functionality. The shock absorbing layer(s) and the impact dispersing effect of the substrate are implemented to substantially absorb and disperse the impact forces of rocks and other debris that impact a windshield. As a result, a rock thrown up by a large truck may deflect off the windshield with only a minor mark caused its impact. In contrast, without the shock absorbing layer a large break or crack in the windshield would likely occur.

Various features of proposed shock absorbing materials must be considered before selecting a suitable shock absorbing layer. In addition to the foregoing mentioned characteristics of suitable laminate films, such as flexibility, high optical transmittance, low distortion, and durability, the shock absorbing layer also needs to have a suitable degree of hardness to absorb and substantially disperse the impact of the debris without breaking or allowing the windshield to break. Accordingly, the shock absorbing layer preferably has a Shore A hardness from about 0 to about 80, more preferably from about 0 to about 20, still more preferably from about 10 to about 20.

In one embodiment of the invention, a shock absorbing adhesive layer can be used. Such a material may be a single layer of an optical grade adhesive or a relatively thick layer of two or more optical grade adhesives. For example, two 5 mil layers of laminar optical adhesive can be placed back to back to provide a single 10 mil shock absorbing adhesive layer with excellent shock absorbing, adhesive, and optical properties. Suitable optical grade adhesives include materials disclosed herein or otherwise known in the art. For example, the OPTICALLY CLEAR LAMINATING ADHESIVES 8141, 8142, 8161, and 9483 from the 3M Corporation may be suitable for use as a shock absorbing layer in some embodiments of the invention when applied in a sufficient thickness.

In one embodiment of the invention, the optical adhesive intended for use as a shock absorbing adhesive layer is obtained in mass form and applied to the aforementioned substrate to a desired thickness. Notably, such use may include applying the adhesive much thicker than is contemplated when it is used solely for its adhesive properties.

As previously noted, the particular selection of layer materials and thicknesses may depend on the angle at which a windshield is inclined, such as 90° in the case of security vehicles all the way down to about 27° for some sport vehicles. For a 27° windshield, one preferred laminate film will have 17 GSM adhesive under a 4 mil substrate layer with a suitable scratch resistant coating. These layers are relatively thin because the angle at which a user looks through the windshield increases the amount of laminate film they look through. A 90° windshield, in turn, may have up to 7 mils of PET and 7 mils of adhesive, with a scratch resistant coating, and still maintain suitable clarity.

Referring now to FIG. 3A, according to one embodiment of the invention, a protective laminate film 300 may include a scratch-resistant coating layer 304, a polymeric substrate layer 306, an adhesive layer 308, and a release liner 310 on the glass adjacent surface of the adhesive layer 308. FIG. 3B illustrates a protective laminate film 300' that further includes a clear backing liner 303 on an outer surface of the scratch-resistant coating. The clear backing liner 303 and release liner 310 allow the laminate film 300 to be handled, stored, transported, and installed without wear and soiling of the upper and lower surfaces of the protective film. Alternatively, liners or backing formed of a non-clear material may be substituted for the clear backing and/or the release liner.

FIG. 4 illustrates another embodiment of a protective film 400 according to the invention, which includes a scratch-resistant coating layer 404, a first adhesive layer 405 between the scratch-resistant coating 404 and a polymeric substrate layer 406, a second adhesive layer 408 on an opposite side of the substrate layer 406, and a release liner 410 adjacent to the second adhesive layer 408. The first adhesive layer 405 increases adhesion of the scratch-resistant coating 404 to the polymeric substrate layer 406. The first adhesive layer 405 may comprise the same adhesive material as the second adhesive layer 408. In one embodiment, the first adhesive layer 405 has a thickness that is substantially less than the thickness of the second adhesive layer 408. In another embodiment, the first adhesive layer 405 has a thickness that is equal to or exceeds the thickness of the second adhesive layer 408 in order to provide added shock absorbance instead of or in addition to shock absorbance that may be provided by the second adhesive layer 408.

FIG. 5A illustrates another embodiment of a protective film 500 according to the invention, which includes a scratch-resistant coating layer 504, a first adhesive layer 505 between the scratch-resistant coating 504 and a polymeric substrate layer 506, a second adhesive layer 508 on an opposite side of the substrate layer 506, and a release liner 510 adjacent to the second adhesive layer 508. The first adhesive layer 505 is further comprised of an adhesion promoter layer 514 on a surface of the polymeric substrate layer 506 opposite the adhesive layer 508 and a primer layer 512 on top of the adhesion promoter layer 514. The adhesion promoter layer 514 increases the bond between the primer layer and the substrate layer and may comprise, for example, an acrylic-based resin, such as a mixture of polyurethane and acrylic resins. The adhesion promoter layer preferably has a thickness in a range of about 0.05 micron to about 1 micron, more preferably about 0.075 micron to about 0.75 micron, and most preferably about 0.1 micron to about 0.5 micron. According to one embodiment, the adhesion promoter of a thickness of about 0.25 micron (or about 0.00001 inch).

The primer layer may comprise a blend of fluoropolymer and acrylic resin. In addition, the primer may include a UV protective compound known in the art in order to provide UV protection for itself and any underlying layers. The primer layer preferably has a thickness in a range of about 0.5 micron to about 10 microns, more preferably about 0.75 microns to about 7.5 microns, and most preferably about 1 micron to about 5 microns.

FIG. 5B illustrates an exemplary embodiment of a protective film 500' according to the invention, which is similar to protective film 500 shown in FIG. 5A, except that it further includes a second adhesion promoter layer 516 between the polymeric substrate layer 506 and the adhesive layer 508 in order to enhance adhesion between the substrate 506 and adhesive 508. Adhesion promoter layer 516 may be the same material as adhesion promoter layer 514 and may have approximately the same thickness. According to one embodiment, the adhesion promoter layer is applied to the top and bottom surfaces of the polymeric substrate layer as an acrylic resin that is non-tacky at room temperature. Thereafter, a layer of pressure sensitive adhesive 508 is applied to the adhesion promoter layer 516 on the window side of the substrate layer 506 and a primer layer 512 is applied to the adhesion promoter layer 514 on the outer surface of the polymeric substrate layer 506.

One currently preferred laminate film coating has the following layers and dimensions:

| | |
|---|---|
| Scratch-Resistant Layer | ~0.4 mil |
| Primer Layer | ~0.1 mil |
| Adhesion Promoter Layer | ~1/100 mil |
| PET or Polycarbonate Substrate | ~4 mils |
| Adhesion Promoter Layer | ~1/100 mil |
| Pressure Sensitive Adhesive Layer | ~0.75 mil |

There are various methods of installing thin films to glass surfaces. For example, it is well known that there are a variety of methods for installing tinting to automobile windows, including, for example, wet-lamination, dry-lamination, the use of steam or water as a lubricating solution, and the use of a hard or soft squeegee. Accordingly, the following description of one exemplary method of installing a laminate film is not limiting of the ways in which the laminate films of the invention can be installed. Rather, it will be understood by those skilled in the art that there are numerous methods of installing films to glass surfaces and that some of these may also be employed to install the inventive laminate films described herein. In particular, suitable installation methods require careful handling of the film to maintain a surface free of optical defects.

In the described embodiment of the invention, the following tools are recommended for installation: stainless steel knife; 32 oz water bottle (for slip agent); soap for cleansing agent; gallon of distilled water; 6" soft cleaning squeegee; 4" hard Teflon squeegee; and heat gun.

The film can be applied to an un-mounted windshield or a mounted windshield (mounted in a vehicle). Although not required, indoor installations are preferred. The indoor installation provides a more controlled environment which reduces the chance of dirt or debris becoming trapped between the windshield and the laminate film. In the case of outdoor installations, the amount of time that the adhesive is exposed before it is applied should be as short as possible.

Initially, the condition of a windshield is important to a successful laminate film installation. This is because a laminate film bonds best with a new windshield that is both clean and unmarred. A cracked or pitted windshield will tend to trap additional moisture during the installation, which results in a product that may not look as good as a new windshield having the laminate film applied. Nevertheless, a laminate film can be applied to a cracked or pitted windshield if desired. Of course, a clean windshield is also important in achieving an optically clear installation. This is because any foreign materials that remain between the glass and the laminate film during installation will remain for the life of the protective film.

Accordingly, a first installation step is selecting the correct laminate film for the vehicle to be protected. As previously noted, the precise configuration of a laminate film, including, for example, layer thicknesses and layer materials, may vary based on the angle of inclination of the windshield and the automobiles expected use. It is important for optimum performance, therefore, to verify that a correctly selected film is used for installation.

Next, as previously noted, the windshield is advantageously cleaned and inspected. This may involve first spraying the windshield with a warm water/soap solution or other approved lubricant. Preferably, the lubricants will not contain any additional chemicals that could cloud over time or react with the adhesive. In some cases, simple water may be the most effective lubricant. A window razor is then used to remove any dirt, bugs or other debris by scraping the wet, lubricated windshield. Care must be used to not scratch the windshield during the cleaning process as a window cleaning razor can scratch glass. The lubricating solution such as water helps ensure that the windshield is not scratched by the razor. A squeegee and damp paper towel can then be used to remove any loosened debris and lubricating solution. This process can be repeated, using the lubricating solution and razor to remove any remaining debris on the windshield. After the debris and lubricating solution are again removed, the windshield should be clean and ready to accept the laminate film.

The laminate film is preferably pre-cut to the correct size, but may also be trimmed during installation to fit the windshield. In either case, it is preferably fit to within ¼" to ¹⁄₁₆" from the edge molding on each side of the windshield glass. If the laminate film must be trimmed during installation, a stainless steel knife blade is advantageous as steel blades may scratch the glass. The trimmed laminate film should be checked for wrinkles or folds to determine the amount of hand forming required to conform the film to the glass.

Figure 6:
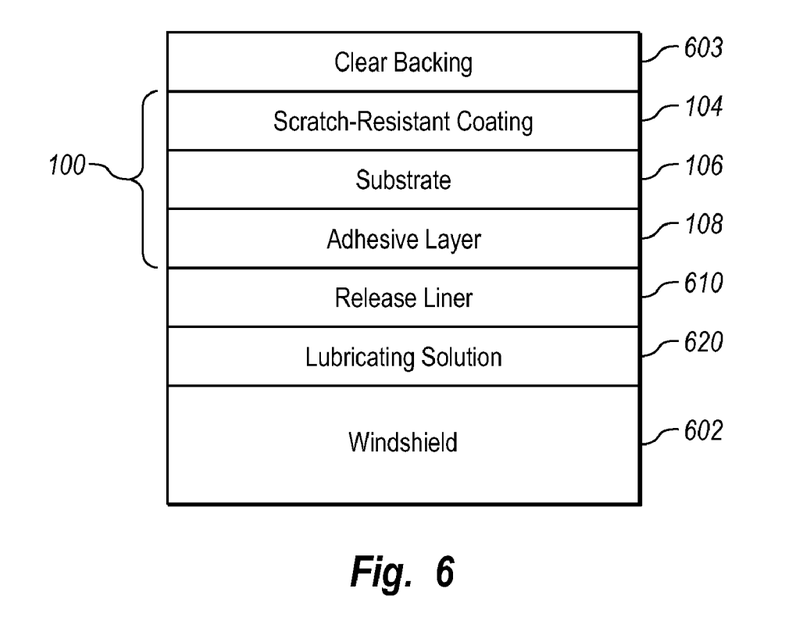
FIG. 6 is a box diagram that schematically illustrates one step in the process of applying a protective laminate film to a windshield according to an embodiment of the invention.

For non pre-formed installations or where the laminate film does not fit perfectly, a heat gun and hard squeegee can be used to remove any folds and wrinkles and adjust the shape of the laminate film. There are two common methods derived in the window tint industry for shaping film to a contoured surface for this purpose. These are commonly referred to as "dry shrinking" or "wet shrinking." Either method is acceptable. The wet method involves first wetting a windshield 602 with a lubricating solution 620 such as water. The laminate film is placed on the windshield in the proper orientation (as though it was actually installed with the release liner against the window and the scratch resistant coating facing out). A squeegee is used to gently remove the lubricating solution from the center of the film. Ridges where the film is to be shrunk are formed by the squeegee action, preferably towards the periphery of the windshield since the laminate film will more easily shrink along the top and bottom of the windshield.

The heat gun is next used to carefully apply heat to warm the laminate film and start the shrinking process. A squeegee can be used to carefully conform the laminate film to the windshield to avoid any wrinkles. Additional water may be used as needed behind the film. When finished, the laminate film should lie on the windshield without any large wrinkles or folds. Slight wrinkles can be removed during the final installation step further below. At this point, it is important to note that the laminate film has not yet been affixed to the windshield.

The "dry method" is essentially the same as the "wet method" previously described, with one notable change. A dryer sheet or a wool glove is rubbed onto the glass to setup a static charge to hold the film in place during the shrinking process.

The laminate film is then removed from the windshield for a final cleaning. One preferred method for a final cleaning is to spray the windshield with water using a spray bottle. A squeegee is again used to remove the water and any dust or particles. The windshield is now ready for the laminate film to be applied.

Starting at one corner, with the help of a piece of tape if necessary, the release liner is partially removed from the laminate film while spraying the adhesive with the slip agent. The release liner is then allowed back to the original position. This process is repeated on the remaining portion of the laminate film such that the release liner is loosened from the laminate film for the actual application. The film is then rolled across the windshield into a roll of approximately 2" diameter. This is commonly referred to as the "reverse roll" installation method. The installer should be careful not to allow anything to come into contact with the adhesive, as foreign debris may then be sandwiched between the window and adhesive during final installation. If lint or other small objects do come in contact with the adhesive layer, however, it may be possible to wash the lint off using the slip agent.

In one embodiment, the laminate film has a release liner 610 or clear backing 603 on each surface thereof. Accordingly, it may be preferred that only the lower release liner is removed at this time but that the upper clear backing remains in place during installation so that the upper surface of the laminate film can be more easily handled during application of the laminate film without scratching or moving the outer surface.

The slip agent is important for a successful installation. The slip agent can be various solutions, for example, distilled water or water and a small amount of clean soap such as a dishwashing detergent (e.g., crystal light). Alcohol and other spirit based products should not be used as they may react with the adhesive. The slip agent is preferably applied to the windshield so that the applied protective laminate film can be adjusted into position on the windshield before the slip agent dries and the adhesive layer securely adheres to the windshield. Too much slip agent is not possible while too little may cause a difficult or failed installation. The slip agent is preferably used by coating the windshield and the adhesive side of the laminate film with a generous coating of slip agent. With the wet windshield and the wet film, the next step is to position the laminate film onto the windshield using the reverse roll method.

After the laminate film is positioned on the windshield, a Teflon squeegee may be used to remove slip agent and trapped air between the laminate film and windshield. A generous amount of slip agent is placed on the exterior surface of the laminate film to facilitate and lubricate the squeegee process. In addition, the squeegee can be covered with a soft cloth that is damp with slip agent to reduce the chance of scratching the exterior surface of the laminate film.

Next, starting in the top and center of the windshield, a vertical line is drawn in the downward direction with the squeegee to temporarily adhere and loosely hold the laminate film in place. Additional strokes are performed, working from the center to each side of the windshield. It is also preferred to adjust the cloth on the squeegee to a new clean position for each stroke. This helps to remove any debris from the windshield that may be flushed out from under the trim and caught in the squeegee towel. It may also be helpful to add additional slip agent on the outside of the laminate film as needed to act as a lubricant until the squeegee process is completed. This helps reduce the possibility of scratching by the squeegee.

The process of using the squeegee, top to bottom, working from the inside out, is continued to push the water out to the edges until all the air bubbles and substantially all of the slip agent are removed. It is desirable to remove as much of the slip agent as possible before the adhesive becomes fully tacked (or adhered) to the windshield. If a small amount of moisture remains trapped, it may evaporate through the laminate film over the next few days or week depending on the ambient temperature. A heat gun may be used to remove any remaining wrinkles in the laminate film.

Finally, a stainless steel window knife may be used to trim the excess laminate film to within ⅛" of the windshield trim. If a backing layer is present over the scratch resistant surface, it may be removed at this time.

The installation is then ready for inspection. A cloth and window cleaner can be used to remove any dirt or finger prints from the film. In particular, the edges should be inspected to ensure a proper bond. If any moisture pockets are found near the edges, the Teflon squeegee can be used to push them out. When properly installed, a windshield laminate will not trap any air bubbles between the laminate film and windshield. The foregoing method of installation will not result in any areas of significant distortion other than distortion from any small moisture pockets that were left between the film and the windshield. As the small moisture pockets evaporate the distortion will disappear.

Full adhesion typically will not occur for 72 hours or longer depending on outside temperatures. For typical embodiments of the invention, the laminate film adhesive should reach a level of adhesion sufficient to handle freeway speeds and automatic car washes within one hour of the installation.

In one embodiment, the laminate film's edge may be bonded to the windshield glass with, for example, a black silicone rubber sealant. The edge sealer is preferably covered by a temporary protective tape to protect the silicone bead from the weather, until it is dry.

Optionally, the laminate film can be additionally coated with a silicone oil coating to protect the film even further from bird dung, hand prints, etc. This silicone oil coating can be, for example, 10 to 50 CENTISTOKE silicone oil commercially available from The Dow Corning Corporation of America. The silicone oil coating is applied by spraying or hand wiping.

The laminate films of the invention can be manufactured by any of the various calendaring methods and devices known in the art for forming laminate films, including for example heat laminating and cold wet laminating. In one embodiment of the invention, the manufactured films can be cut to size and thermoformed to a windshield mold, thereby pre-forming the laminate film to a shape that matches that of a curved windshield. This method can reduce distortion, if any, that a laminate film might otherwise cause on a curved windshield.

The protective laminate films can be left applied to a windshield for as long as desired, from a matter of days up to several years or more. For example, an automobile rental company may affix a protective laminate film to a rental car's windshields. After the end of the rental car's period of use as a rental, the protective laminate film can be removed prior to sale. Such a usage can significantly reduce the cost to rental car companies in replacing or repairing automobile windshields prior to sale of their used car fleets. Similarly, an automobile lessee may desire to apply the film to the leased vehicle for the term of the lease, thus reducing the chances of having to pay the cost of a damaged windshield at the end of a lease period.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A laminate film adapted for use in protecting a transparent surface from scratching or optical damage, comprising:
    a flexible substrate comprising a first surface and a second surface, the flexible substrate having a first composition;
    a first flexible adhesive layer adhered to the first surface of the flexible substrate;
    a flexible scratch-resistant coating adhered to the first flexible adhesive layer, the flexible scratch-resistant coating having a second composition that is different and more scratch-resistant than the first composition; and
    a second flexible adhesive layer adhered to the second surface of the flexible substrate,
    the flexible substrate, the flexible scratch-resistant coating, and the first and second flexible adhesive layers being selected, and the laminate film having an overall thickness, so as to provide the laminate film with a consistent refractive index across the laminate film so as to be substantially optically transparent,
    the laminate film being shock absorbing and flexible so as to readily conform to a shape of a transparent surface or be wound and stored as a roll while remaining substantially optically transparent and shock absorbing and retaining a consistent refractive index.

2. A laminate film as defined in claim 1, wherein the flexible substrate is comprised of a polyester material, wherein the first flexible adhesive layer is in direct contact with the polyester material without any intervening layers.

3. A laminate film as defined in claim 2, wherein the polyester material is polyethylene terephthalate.

4. A laminate film as defined in claim 1, wherein the flexible substrate is comprised of a polycarbonate material.

5. A laminate film as defined in claim 1, wherein the flexible substrate has a thickness in a range of about 2 mils to about 10 mils.

6. A laminate film as defined in claim 1, wherein the flexible substrate has a thickness in a range of about 3 mils to about 5 mils.

7. A laminate film as defined in claim 1, wherein the first flexible adhesive layer is formed from an acrylic resin.

8. A laminate film as defined in claim 1, wherein the first flexible adhesive layer is comprised of an adhesion promoter layer adjacent to and in direct contact with the first surface of the flexible substrate and a primer layer between the adhesion promoter layer and the scratch-resistant layer.

9. A laminate film as defined in claim 8, wherein the adhesion promoter layer is formed from an acrylic-polyurethane resin.

10. A laminate film as defined in claim 8, wherein the adhesion promoter layer has a thickness in a range of about 0.05 micron to about 1 micron.

11. A laminate film as defined in claim 8, wherein the adhesion promoter layer has a thickness in a range of about 0.075 micron to about 0.75 micron.

12. A laminate film as defined in claim 8, wherein the adhesion promoter layer has a thickness in a range of about 0.1 micron to about 0.5 micron.

13. A laminate film as defined in claim 8, wherein the primer layer is formed from an acrylic-fluoropolymer resin and an ultra-violet (UV) inhibitor.

14. A laminate film as defined in claim 8, wherein the primer layer has a thickness in a range of about 0.5 micron to about 10 microns.

15. A laminate film as defined in claim 8, wherein the primer layer has a thickness in a range of about 0.75 micron to about 7.5 microns.

16. A laminate film as defined in claim 8, wherein the primer layer has a thickness in a range of about 1 micron to about 5 microns.

17. A laminate film as defined in claim 1, wherein the scratch-resistant coating is formed from a mixture comprising one or more acrylic monomers and colloidal silica.

18. A laminate film as defined in claim 1, wherein the scratch-resistant coating has a thickness from about 2 microns to about 20 microns.

19. A laminate film as defined in claim 1, wherein the scratch-resistant coating has a thickness from about 7.5 microns to about 12.5 microns.

20. A laminate film as defined in claim 1, wherein the second adhesive layer is comprised of a pressure sensitive adhesive.

21. A laminate film as defined in claim 1, wherein the adhesive layer has a thickness from about 12 grams per square meter (GSM) to about 30 grams per square meter (GSM).

22. A laminate film as defined in claim 1, further comprising a flexible protective release liner adjacent to the second adhesive layer.

23. A laminate film as defined in claim 1, further comprising a backing layer adjacent to the flexible scratch-resistant coating.

24. A laminate film adapted for use in protecting a transparent surface from scratching or optical damage, comprising:
    a flexible substrate comprising a first surface and a second surface, the flexible substrate having a first composition;

a first adhesion promoter layer having a first side adjacent to and in direct contact with the first surface of the flexible substrate;

a primer layer adjacent to a second side of the adhesion promoter layer opposite the first side;

a flexible scratch-resistant coating adjacent to the primer layer, the flexible scratch-resistant coating having a second composition that is different and more scratch-resistant than the first composition and protects against scratching by mechanical forces;

a second adhesion promoter layer having a first side adjacent to the second surface of the flexible substrate; and a flexible adhesive layer adhered to a second side of the second adhesion promoter layer, the flexible substrate, the flexible scratch-resistant coating, the first and second adhesion promoter layers, the primer layer, and the flexible adhesive layer being selected, and the laminate film having an overall thickness, so as to provide the laminate film with a consistent refractive index across the laminate film.

25. A laminate film as defined in claim 24, wherein the scratch-resistant coating is formed from a mixture comprising one or more acrylic monomers and colloidal silica.

26. A laminate film as defined in claim 24, wherein the flexible substrate has a thickness in a range of about 2 mils to about 10 mils, wherein at least one of the first or second adhesion promoter layers has a thickness in a range of about 0.05 micron to about 1 micron, wherein the primer layer has a thickness in a range of about 0.5 micron to about 10 microns, wherein the scratch-resistant coating has a thickness from about 2 microns to about 20 microns.

27. A laminate film as defined in claim 26, wherein the scratch-resistant coating is formed from a mixture comprising one or more acrylic monomers and colloidal silica.

28. A laminate film as defined in claim 24, further comprising a flexible protective release liner adjacent to the flexible adhesive layer.

29. A laminate film as defined in claim 24, further comprising a backing layer adjacent to the flexible scratch-resistant coating.

30. A laminate film having shock absorbing properties and being adapted for use in protecting a transparent surface, the laminate film comprising:

a combined scratch-resistant, shock absorbing, and flexible substrate comprising a monolithic material and having an exterior surface and an interior surface, the exterior surface comprising a polymer material that is ultra-violet (UV)-stabilized and substantially scratch-resistant, wherein the polymer material includes at least one of a scratch-resistant polyester, scratch-resistant acrylic acrylate, or colloidal silica, the substrate having a thickness in a range of about 2 mils to about 10 mils;

an adhesion promoter layer adhered to the interior surface of the substrate and having a thickness in a range of about 0.05 micron to about 1 micron; and a shock absorbing and flexible adhesive layer adhered to the adhesion promoter layer, wherein the shock absorbing adhesive layer of the laminate film has a thickness and a Shore A hardness so as to be effective to:

contribute to dispersing the impact forces of debris that contacts the laminate film when adhered to a transparent surface and thereby reduce damage to the transparent surface; and securely adhere the laminate film to the transparent surface when applied thereto while substantially maintaining optical transparence of the transparent surface, the combined scratch-resistant, shock absorbing, and flexible substrate, the adhesion promoter layer, and the shock absorbing and flexible adhesive layer being selected and having thicknesses so as to provide the laminate film with a consistent refractive index across the laminate film so as to be substantially optically transparent and protect against scratching of a transparent surface by mechanical forces, and the laminate film being flexible so as to readily conform to a transparent surface or be wound and stored as a roll while remaining substantially optically transparent and shock absorbing and retaining a consistent refractive index.

31. A laminate film as defined in claim 30, further comprising a flexible protective release liner adjacent to the shock absorbing and flexible adhesive layer and a backing layer adjacent to the combined scratch-resistant, shock absorbing, and flexible substrate.

32. A protected transparent window comprising:

a rigid transparent window having a flat or convex exterior surface; and a protective laminate film having shock absorbing properties affixed to the exterior surface of the rigid transparent window, the laminate film comprising:

a polymer substrate comprising a first surface and a second surface, the polymer substrate having a first composition;

a first adhesive layer adhered to and in direct contact with the first surface of the polymer substrate;

a scratch-resistant coating adhered to the first adhesive layer, the scratch-resistant coating having a second composition that is different and more scratch-resistant than the first composition and protects against scratching by mechanical forces; and a second adhesive layer adhered to the second surface of the polymer substrate and the exterior surface of the rigid transparent window, the polymer substrate, the scratch-resistant coating, and the first and second adhesive layers being selected, and the laminate film having a thickness, so as to provide the laminate film with a consistent refractive index across the laminate film so as to be substantially optically transparent, and the laminate film being shock absorbing so as to protect the rigid transparent window from mechanical impacts.

33. A laminate film adapted for use in protecting an outer surface of a flat or curved transparent window, comprising:

a flexible substrate comprising a first surface and a second surface, the flexible substrate having a first composition;

a first flexible adhesive layer adhered to and in direct contact with the first surface of the flexible substrate;

a flexible scratch-resistant coating adhered to the first flexible adhesive layer, the flexible scratch-resistant coating having a second composition that is different and more scratch-resistant than the first composition; and a second flexible adhesive layer adhered to the second surface of the flexible substrate for adhering the laminate film to an outer surface of a flat or curved transparent window, the flexible substrate, flexible scratch-resistant coating, and the first and second flexible adhesive layers being selected, and the laminate film having an overall thick ness, so as to provide the laminate film with a consistent refractive index across the laminate film so as to be substantially optically transparent, wherein the laminate film is configured to provide shock absorbance to a flat or curved transparent window and is pre-sized so as to approximate a size and shape of the flat or curved transparent window to which it is designed to be attached.

34. A laminate film as defined in claim 33, further comprising a flexible protective release liner adjacent to the second flexible adhesive layer and backing layer adjacent to the flexible scratch-resistant coating.

\* \* \* \* \*